(12) United States Patent
Stefes et al.

(10) Patent No.: US 10,543,908 B2
(45) Date of Patent: Jan. 28, 2020

(54) VORTEX GENERATOR ARRANGEMENT FOR AN AIRCRAFT

(71) Applicant: Airbus Operations GmbH, Hamburg (DE)

(72) Inventors: Bruno Stefes, Hamburg (DE);
Wolfgang Eilken, Hamburg (DE);
Erich Paul, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 453 days.

(21) Appl. No.: 15/365,133

(22) Filed: Nov. 30, 2016

(65) Prior Publication Data
US 2017/0152025 A1    Jun. 1, 2017

(30) Foreign Application Priority Data
Dec. 1, 2015   (EP) ..................................... 15197297

(51) Int. Cl.
*B64C 23/06*   (2006.01)
*B64C 3/00*    (2006.01)
(Continued)

(52) U.S. Cl.
CPC ................ *B64C 23/06* (2013.01); *B64C 3/00* (2013.01); *B64C 5/02* (2013.01); *B64C 9/00* (2013.01); *B64C 9/14* (2013.01)

(58) Field of Classification Search
CPC .......... B64C 23/06; B64C 13/16; B64C 9/02; B64C 3/00; B64C 5/02; B64C 9/14;
(Continued)

(56) References Cited

U.S. PATENT DOCUMENTS

| 2,896,880 | A | * | 7/1959 | Vogler | ...................... B64C 5/08 |
| | | | | | 244/203 |
| 4,039,161 | A | * | 8/1977 | Bauer | ..................... B64C 23/06 |
| | | | | | 138/39 |

(Continued)

FOREIGN PATENT DOCUMENTS

| EP | 2 441 669 A2 | 4/2012 | |
| EP | 2441669 A2 | * 4/2012 | ............... B64C 5/06 |

OTHER PUBLICATIONS

Extended European Search Report for Application No. 15197297 dated May 18, 2016.

*Primary Examiner* — Assres H Woldemaryam
(74) *Attorney, Agent, or Firm* — Jenkins, Wilson, Taylor & Hunt, P.A.

(57) ABSTRACT

A vortex generator arrangement for an aircraft, a flow control system and an aircraft comprising such vortex generator arrangement. The arrangement includes a surface portion facing a first region of space to constitute a flow surface, a vortex generating element, an element support structure connected to the element, a mounting structure. The element support structure and the element together are rotatable between first and second positions and a biasing device, retainer and release are provided. The rotational axis extends transversely with respect to the surface portion. The projection of the element onto a projection plane is smaller in the first rotational position than in the second rotational position, the projection plane extending perpendicularly to a tangent plane of the surface portion at a reference point of the surface portion and to a predetermined direction parallel to the extension of the tangent plane.

20 Claims, 7 Drawing Sheets

(51) Int. Cl.
*B64C 5/02* (2006.01)
*B64C 9/00* (2006.01)
*B64C 9/14* (2006.01)

(58) Field of Classification Search
CPC ......... B64C 9/00; Y02T 50/162; Y02T 50/32; Y02T 50/44
See application file for complete search history.

(56) References Cited

U.S. PATENT DOCUMENTS

| | | | |
|---|---|---|---|
| 5,445,346 A | | 8/1995 | Gilbert |
| 6,105,904 A | * | 8/2000 | Lisy .......... B64C 3/58 244/130 |
| 6,427,948 B1 | | 8/2002 | Campbell |
| 6,685,143 B1 | * | 2/2004 | Prince ........ B64C 5/12 244/203 |
| 9,638,176 B2 | * | 5/2017 | Shivashankara ...... B64C 9/32 |
| 2004/0129838 A1 | * | 7/2004 | Lisy .......... B64C 23/06 244/204.1 |
| 2010/0038492 A1 | * | 2/2010 | Sclafani ....... B64C 7/02 244/199.1 |
| 2011/0110777 A1 | * | 5/2011 | Abdallah ...... F03D 1/0608 416/23 |
| 2016/0176531 A1 | * | 6/2016 | Biehl ......... B64D 17/025 244/151 R |
| 2016/0229526 A1 | * | 8/2016 | Hegenbart ...... B64C 9/02 |
| 2017/0096214 A1 | * | 4/2017 | Stefes ......... B64C 9/02 |

* cited by examiner

VORTEX GENERATOR ARRANGEMENT FOR AN AIRCRAFT

CROSS-REFERENCE TO RELATED APPLICATION

This application claims priority to European Patent Application No. 15197297.3 filed Dec. 1, 2015, the entire disclosure of which is incorporated herein by reference.

TECHNICAL FIELD

The present disclosure relates to a vortex generator arrangement for an aircraft, to a flow control system comprising such vortex generator arrangement, and to an aircraft comprising such a vortex generator arrangement or flow control system. The vortex generator arrangement comprises a surface portion facing and bounding a first region of space and adapted or configured to constitute a flow surface for a flow present in operation in the first region of space, a vortex generating element disposed in the first region of space, an element support structure rigidly connected to the vortex generating element, a mounting structure to which the element support structure is mounted such that the element support structure and the vortex generating element together are rotatable with respect to the mounting structure about a rotational axis between a first rotational position and a second rotational position, a biasing device by which the vortex generating element is biased towards the second rotational position, a retainer adapted or configured to retain the vortex generating element in the first rotational position against the biasing by the biasing device, and a release adapted or configured to release the vortex generating element from the retainer such that it is moved into the second rotational position by the biasing device. The present disclosure further relates to a flow control system comprising a plurality of such vortex generator arrangements, and to an aircraft comprising such vortex generator arrangements or flow control system.

BACKGROUND

The aerodynamic effect of aerodynamically active aircraft components, such as wings, vertical and horizontal tail planes, rudders, control flaps, slats and high lift devices is based to a large degree on the profile or characteristics of the flow established in flight above the surface of the respective aircraft component. When it is desired to be able to selectively influence the flow so-called vortex generators may be provided. Vortex generators are projections arranged on flow surfaces of aircraft components and adapted or configured to selectively generate vortices or turbulence in the region of the boundary layer between the flow over the flow surface and the flow surface and to thereby supply energy to the flow. This may be advantageous, e.g., when it is desired to achieve a maximum possible aerodynamic effect of an aerodynamically active aircraft component.

The effect of vortex generators is advantageous predominantly in particular flight or operating conditions or situations. However, vortex generators also tend to increase drag. For this reason, selectively extendable and retractable vortex generators are known, which are, if possible, only extended in selected situations and maintained in the retracted condition otherwise in order not to increase drag.

SUMMARY

It is an object of the present disclosure to provide a vortex generator arrangement, which is of a particularly simple construction and which is particularly simple to adapt to different flow surfaces and aircraft, and to provide a flow control system and an aircraft comprising such vortex generator arrangement.

A first aspect provides a vortex generator arrangement of the above kind in which the rotational axis extends transversely with respect to the surface portion, the vortex generating element is disposed completely in the first region of space in each rotational position thereof about the rotational axis, and the projection of the vortex generating element onto a projection plane is smaller in the first rotational position than in the second rotational position, wherein the projection plane extends perpendicularly to a tangent plane of the surface portion at a reference point of the surface portion and to a predetermined direction parallel to the extension of the tangent plane.

In other words, in a first aspect the present disclosure relates to a vortex generator arrangement for an aircraft, wherein the vortex generator arrangement comprises a surface portion, which is preferably planar, but may also be curved. The surface portion faces and bounds a first region of space and is adapted or configured to constitute a flow surface for a flow present in operation in the first region of space, i.e., in flight of an aircraft provided with the vortex generator arrangement. Thus, in other words, the flow portions forms or constitutes a flow surface interacting with a flow surrounding an aircraft in operation into or to which the vortex generator arrangement has been mounted. It may, for example, form part of an outer surface or flow surface of an aerodynamic body of the aircraft, such as, e.g., a vertical tail plane of the aircraft.

The vortex generator arrangement further comprises a vortex generating element, which may be, e.g., a blade or blade-shaped, and which is disposed in the first region of space, an element support structure and a mounting structure. The element support structure is rigidly connected to the vortex generating element, such that the element support structure and the vortex generating element move together. The vortex generating element may be integrally formed in one piece with the element support structure, i.e., it may be a part of a larger structure of which the element support structure is another part. However, it is also possible that the vortex generating element is constituted by a separate component which is secured to the element support structure. The element support structure is mounted to the mounting structure such that the element support structure and the vortex generating element together are rotatable with respect to the mounting structure about a fixed rotational axis between a first rotational position and a second rotational position. The first and second rotational positions are preferably end positions defined by corresponding suitable stops or stop devices. Preferably, the first and second rotational positions are rotationally offset from each other by 30° or more than 30°.

The vortex generator arrangement also comprises a biasing device and a retainer. The biasing device is arranged and adapted or configured to bias the vortex generating element—and consequently also the element support structure—towards the second rotational position, and the retainer is adapted or configured to retain the vortex generating element in the first rotational position against the biasing by the biasing device, thereby preventing it from unintended movement to the second rotational position. The vortex generator arrangement further comprises a release adapted or configured to release or disconnect the vortex generating element from the retainer such that it is moved into the second rotational position by the biasing device. The release and the biasing device may or may not be distinct units or elements. Preferably, the release is configured to be automatically actuated to release the vortex generating element upon a loss of power supply to the vortex generator arrangement in order to provide for fail safe operation.

The rotational axis extends transversely and preferably perpendicularly with respect to the surface portion. In particular, if the rotational axis intersects the surface portion it extends transversely and preferably perpendicularly with respect to a tangent plane of the surface portion at the location at which the rotational axis intersects the surface portion. Otherwise, i.e., if the rotational axis extends through an opening in the surface portion it extends transversely and preferably perpendicularly with respect to a tangent plane of an extrapolation of the surface portion into the opening at the location at which the rotational axis intersects the extrapolation of the surface portion.

The vortex generating element is disposed completely in the first region of space in each possible rotational position thereof about the rotational axis. In other words, in all possible rotational positions including the first and second rotational positions, any rotational position between them and possibly also rotational positions beyond the first and second rotational positions the vortex generating element extends transversely or perpendicularly to the surface portion completely into the first region of space, so that upon establishing a flow over the surface portion it extends into the flow.

Finally, the vortex generating element and the rotational axis are arranged such that the area of the projection of the vortex generating element onto a projection plane is smaller in the first rotational position than in the second rotational position, wherein the projection plane extends perpendicularly to a tangent plane of the surface portion at a reference point of the surface portion and to a predetermined direction parallel to the extension of the reference plane. Preferably, the reference point is one of the above-mentioned intersection points between the rotational axis and the surface portion or an extrapolation of the surface portion. Due to this arrangement, when in operation a flow is established over the surface portion in the first region of space, which flow has a local flow direction parallel to the predetermined direction at the reference point, the vortex generating element is able to generate turbulence and vortices in the flow when in the second rotational position, and produces smaller drag and less vortices—and preferably no vortices and essentially no drag—in the first rotational position as compared to the second rotational position. Preferably, the amount of drag produced in the first rotational position is less than 10% and preferably less than 5% of the drag produced in the second rotational position.

This construction of a vortex generator arrangement provides the advantage that the size and shape of the vortex generating element can be adapted with a high degree of freedom of design to the particular requirements of a particular aerodynamic body or aircraft, in particular the dimensions and shape of the aerodynamic body and the flow conditions. This is because the vortex generating element is always arranged inside the region of flow and is therefore not restricted by limited space in the interior of an aerodynamic body or a housing of the vortex generator arrangement. At the same time, in the first rotational position, which is assumed under normal flight and operating conditions, the parasitic drag from the vortex generating element can be reduced to an extent to be negligible in that no vortices and only very small disturbances of flow are generated which are not relevant in practice. Consequently, the vortex generator arrangement can be efficiently and easily utilized for different applications, because there is no need for a change of the overall design of the vortex generator arrangement. Rather, it is only necessary and easily possible with no or few design limitations to adapt the dimensions and shape of the vortex generating element.

Moreover, use of the vortex generator arrangement in an aircraft advantageously provides for the possibility to maintain a high efficiency of various aerodynamic bodies or flow bodies, such as, e.g., wings, vertical or horizontal tail planes, flaps, slats, rudders or high lift devices, throughout various different operating conditions, so that the size of the respective aerodynamic bodies or flow bodies can be reduced. Due to this and due to the fact that the vortex generator arrangement is of a simple construction, it is possible to advantageously decrease the total weight of a corresponding aircraft.

For example, the vertical tail plane of an aircraft, including the vertical stabilizer and the vertical rudder mounted thereto, mainly provide directional stability and yawing moment for rotating the aircraft about its vertical or yawing axis. The maximum yawing moment that can be generated by the rudder depends, amongst others, on the size of the vertical rudder and the degree by which the rudder can be deflected about a rudder axis. Simply speaking, more yawing moment can be generated with a larger rudder or a rudder that can be deflected by a greater angle. As the rudder can only be deflected by a limited angle to avoid a stall of the flow at the rudder, the maximum yawing moment is largely determined by the overall dimensions of the rudder. As the maximum yawing moment is never required under regular operating conditions, most of the yawing moment that could be generated by the vertical rudder remains unused under regular operating conditions. In other words, a large portion of the vertical tail plane only generates drag under regular operating conditions and is not required for controlling the aircraft. As drag increases, the fuel consumption increases, which reduces the maximum range of the aircraft, so therefore any unnecessary drag should be avoided. With the above vortex generator arrangement it is flexibly and easily possible to reduce the size of the vertical tail plane, thereby advantageously decreasing the weight.

In a preferred embodiment, the vortex generating element is plate-shaped and is preferably a planar plate having a first extended surface, an opposite second extended surface, and a circumferential edge surface extending between the first and second extended surfaces. The first and second extended surfaces may extend parallel to each other or in a tapering orientation. Preferably, a portion of the edge surface is facing in a direction opposite the predetermined direction in the first rotational position to minimize drag. In particular, in the case of the first and second surfaces being arranged in a tapering configuration, an edge portion towards which the first and second surfaces are tapering is facing in the direction opposite the predetermined direction.

In a preferred embodiment, the vortex generating element extends from the surface portion. Thus, it is connected to the surface portion, e.g., by being integrally formed in on piece with at least a part of the surface portion. In an alternative preferred embodiment, the vortex generating element is spaced from the surface portion by an intermediate portion of the element support structure extending into the first region of space.

In a preferred embodiment, at least a part of the surface portion is a surface of a flexible seal, in particular a sealing membrane, connected to both the mounting structure and the element support structure. Thus, the seal needs to deform upon rotation of the element support structure. By providing such a seal the surface portion may be advantageously configured as an entirely closed surface portion in order to thereby prevent or impede flow to penetrate the surface portion and to further decrease drag. Moreover, entry of snow, ice, rain and other contamination through the surface portion can be prevented or impeded. This tightness against contamination further aids in guaranteeing the functioning of the present vortex generator arrangement.

In an alternative preferred embodiment ensuring that entry of snow, ice, rain and other contamination into a region in which the biasing device and the retainer are located is prevented or impeded, a part of the surface portion is a surface of a rigid plate, which is rigidly coupled to the mounting structure. The rigid plate has an aperture, preferably in the center thereof, through which or into which the element support structure extends to close the aperture, for example by the plate-shaped portion of the element support structure described in the following paragraph. A flexible seal is arranged at a side of the rigid plate opposite the surface portion and is again connected to both the mounting structure and the element support structure. This embodiment has the advantage that the seal, which may again take the form of a sealing membrane, does not need to provide a part of the surface portion, so that it can be optimized with respect to sealing properties only, without having to take into consideration its interaction with a flow in the first region of space. For example, the seal may be corrugated or convoluted to thereby allow it to deform more easily upon rotation of the element support structure.

In a preferred embodiment, the surface portion comprises a first portion and a second portion, wherein the first portion comprises an opening in which the second portion is located, and wherein one of the first and second portions is stationary with respect to the element support structure and the other one of the first and second portions is constituted by a surface of the element support structure. For example, the element support structure may comprise a plate-shaped portion having a surface section constituting at least a part of the surface portion. One or more surfaces or surface sections of the mounting structure and/or of a seal of the above construction may constitute the remainder of the surface portion. In case of providing a seal it is preferably connected to the plate-shaped portion.

In a preferred embodiment, the biasing device, the retainer, the release and at least a part of the element support structure are located inside a second region of space located on a side of the surface portion opposite the first region of space, i.e., the surface portion is disposed between the first and second regions of space, faces away from the second region of space, and at least partially separates the first and second regions of space. The biasing device—and possibly also the release—preferably acts on the part of the element support structure located inside the second region of space.

In particular, in this embodiment, the mounting structure may comprise a housing, which is preferably cylindrical and which defines an interior space. The interior space constitutes the second region of space, and inside the interior space the biasing device, the retainer, the release and at least a part of the element support structure are located, thereby protecting them from contamination. The surface portion is preferably provided, or formed or constituted, at least in part by an outer surface of the housing. Generally, the housing may comprise an end wall or bottom wall and an annularly closed sidewall extending from the end wall in an axial direction of the annularly closed sidewall. At the axial end of the sidewall opposite the end wall, an opening is provided, which is either defined by the corresponding axial end of the sidewall itself or by a cover wall partially closing the housing at the axial end of the sidewall opposite the end wall. Through or into this opening a portion of the element support structure extends from inside the interior space of the housing, which portion is connected to the vortex generating element and may comprise a plate, which is preferably constituted by the above-mentioned plate-shaped portion of the element support structure. This also means that the opening is closed at partially by the element support structure. The opening may be closed completely by a seal of the above-mentioned configuration. The seal, such as a sealing membrane, is then preferably secured to the housing, in particular to the axial end of the sidewall opposite the end wall and/or to the cover wall, if present. The surface portion may then be constituted at least in part by the seal, the axial end of the sidewall opposite the end wall and/or the cover wall, if present. The housing may comprise a pressure balancing hole in a wall thereof.

In a preferred embodiment, the element support structure comprises an elongate shaft portion extending along and defining the rotational axis and at least one projection extending radially from the shaft portion. The biasing device engages the at least one projection. For example, the at least one projection may be constituted by one or more arms extending transversely or perpendicularly from the central shaft, wherein the biasing device—and possibly also the release—acts on or engages the arms at a location spaced from the central shaft.

In a preferred embodiment, the biasing device comprises or constituted by a spring element. Preferably, the biasing device comprises or is constituted by two spring elements. Any such spring element may be, for example, a compression or tension spring. Further, it may be a coil spring or a torsion spring. Using one or more spring elements or other mechanical biasing elements has the advantage of providing a particularly robust drive for moving the vortex generating element between the first and second rotational positions, because no external electrical or hydraulic power source is required. Moreover, one or more spring elements provide for very fast actuation and movement of the vortex generator element, which would not be easily achievable with, e.g., an electric motor. Two or more spring elements are particularly preferred due to providing redundancy, which requires that each spring element alone is already dimensioned to enable it to move the element support structure and the vortex generating element from the first rotational position into the second rotational position. In case of two spring elements it is preferred for them to be disposed at an angular offset of 180° about the rotational axis.

In a preferred embodiment, the retainer comprises a lock, which is movable between a locking position and a release position and adapted or configured to engage a corresponding locking feature on the element support structure when the element support structure is in the first rotational position and the lock is in the locking position such that movement of the element support structure from the first rotational position towards the second rotational position is prevented. The release then comprises an actuator adapted or configured to move the lock between the locking position and the release position. For example, the lock may comprise or be a pin movable along a longitudinal axis thereof in a direction transverse to the rotational axis, and the locking feature may comprise or be a recess dimensioned and arranged to receive the pin.

In an alternative preferred embodiment the retainer comprises—or is formed or constituted by—a strap or a wire connecting the element support structure to the mounting structure to retain the element support structure in the first rotational position. The release then comprises—or is formed or constituted by—a pyrotechnic cutter adapted for cutting the strap or the wire for releasing the vortex generator from the retainer. Such pyrotechnic cutters have been found to be very reliable even under harsh operating conditions.

In a further alternative preferred embodiment the retainer may also be adapted or configured to retain the element support structure in the first rotational position by magnetic force, e.g., by the retainer comprises a permanent magnet arrangement or an electromagnet arrangement. The release may then comprise an actuator adapted or configured to move the element support structure against the magnetic force for a certain distance sufficient to weaken the magnetic attraction allowing the biasing device to overcome the magnetic retaining force. In the case of an electromagnet arrangement, the release may simple be a way for switching of the current through the electromagnet. This also provides for a particularly simple way of achieving fail safe operation.

In a second aspect the present disclosure provides a flow control system comprising an aerodynamic body—and in particular a vertical tail plane—for an aircraft, a plurality of the above-described vortex generator arrangements arranged on the aerodynamic body such that the surface portion of each of the vortex generator arrangements forms a respective part of a surface of the aerodynamic body, and a control unit. The control unit is adapted or configured to selectively actuate the release of the plurality of vortex generator arrangements. The advantages of the flow control system correspond to the advantages of the vortex generator arrangements which the system comprises.

In a preferred embodiment of the flow control system the aerodynamic body comprises a base portion and a control portion movably coupled to the base portion such that the control portion is deflectable with respect to the base portion about a pivot axis from a first angular position towards a second angular position into one or both rotational directions. The plurality of the vortex generator arrangements are arranged along the pivot axis on the base portion and/or the control portion, and the control unit is adapted or configured to actuate the release to release the element support structure from the retainer upon the deflection of the control portion from the first angular position towards the second angular position exceeding a predetermined value. The predetermined value is advantageously chosen such that it is only exceeded when the control portion is deflected beyond the maximum deflection during regular operation, such as in situations in which a maximum possible aerodynamic effect from the deflection of the control portion is desired. Thus, if the predetermined value is set sufficiently high, unintended activation of the plurality of the vortex generator arrangements is prevented. However, if the vortex generator arrangements according to the present disclosure are activated, they may advantageously aid in achieving a desired maximum aerodynamic effect without risking stalling.

The aerodynamic body is preferably a vertical tail plane comprising a vertical stabilizer and a rudder. Then, the base portion is the vertical stabilizer and the control portion is the rudder, and in the first angular position the rudder is aligned with the vertical stabilizer. The predetermined value preferably constitutes a value which is only exceeded in case a maximum available yawing moment provided by the deflected rudder is required and is preferably at least 25°. As the maximum rudder deflection is limited in operation by a flight control system of an aircraft including the flow control system, such maximum deflections may only occur on the ground at speeds below the minimum takeoff speed. Thus, if the predetermined value is set sufficiently high, unintended activation of the plurality of the vortex generator arrangements is prevented. However, if the vortex generator arrangements according to the present disclosure are activated, they advantageously reduce the distortion of the flow at the rudder and, thereby, increase the maximum angle about which the vertical rudder can be deflected without risking a stalling of the flow.

It is preferred if the control unit is further adapted or configured to only actuate the release when a maximum available yawing moment is required. Such a situation can, for example, be detected by a flight control system of an aircraft including the flow control system and can then be transmitted to the control unit of the flow control system. The control unit can, for example, be part of the flight control system of the aircraft.

As already noted above, it is preferred if the release is adapted or configured to release the vortex generating element if the control unit fails or if the release is disconnected from the control unit. Thereby, it is advantageously ensured that the vortex generator arrangement is always activated in case of, e.g., loss of power. As the vortex generating element in the second rotational position does not have considerable detrimental effects on the flight performance of the aircraft, an unintended activation of the vortex generator arrangement is preferred over the risk of a malfunctioning.

In a third aspect the present disclosure provides an aircraft comprising at least one vortex generator arrangement according to any of the above-described embodiments or a flow control system according to any of the above-described embodiments. Each of the vortex generator arrangements is arranged such that in flight of the aircraft a flow over the surface portion of the respective vortex generator arrangement is established. In particular, the flow comprises a portion in which the local flow is directed parallel to the predetermined direction.

In a preferred embodiment, the surface portion is a part of a surface of a wing, a vertical or horizontal tail plane, a flap, a slat, a rudder, or a high lift device of the aircraft.

The advantages of the aircraft correspond to those of the vortex generator arrangements and of the flow control system used therein.

BRIEF DESCRIPTION OF THE DRAWINGS

In the following, exemplary embodiments of a vortex generator arrangement, of a flow control system, and of an aircraft according to the present disclosure will be described with reference to the figures.

Throughout the figures like references numerals will be used to indicate like elements.

DETAILED DESCRIPTION

Figure 1:
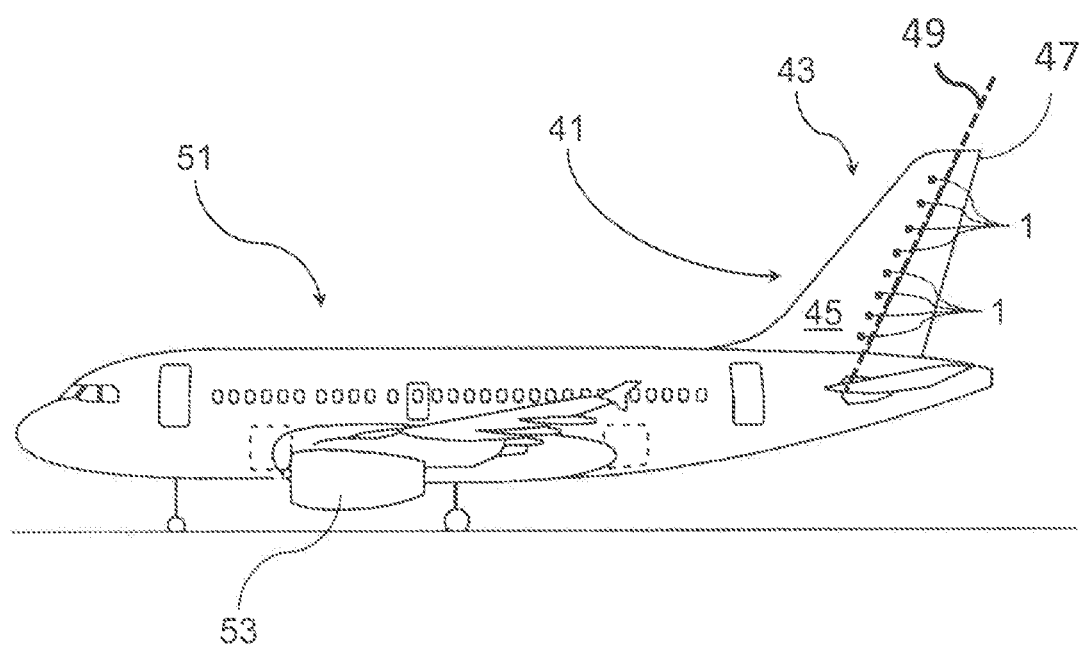
FIG. 1 is a perspective view illustrating an exemplary embodiment of an aircraft according to the present disclosure including a flow control system according to the present disclosure.
Figure 6:
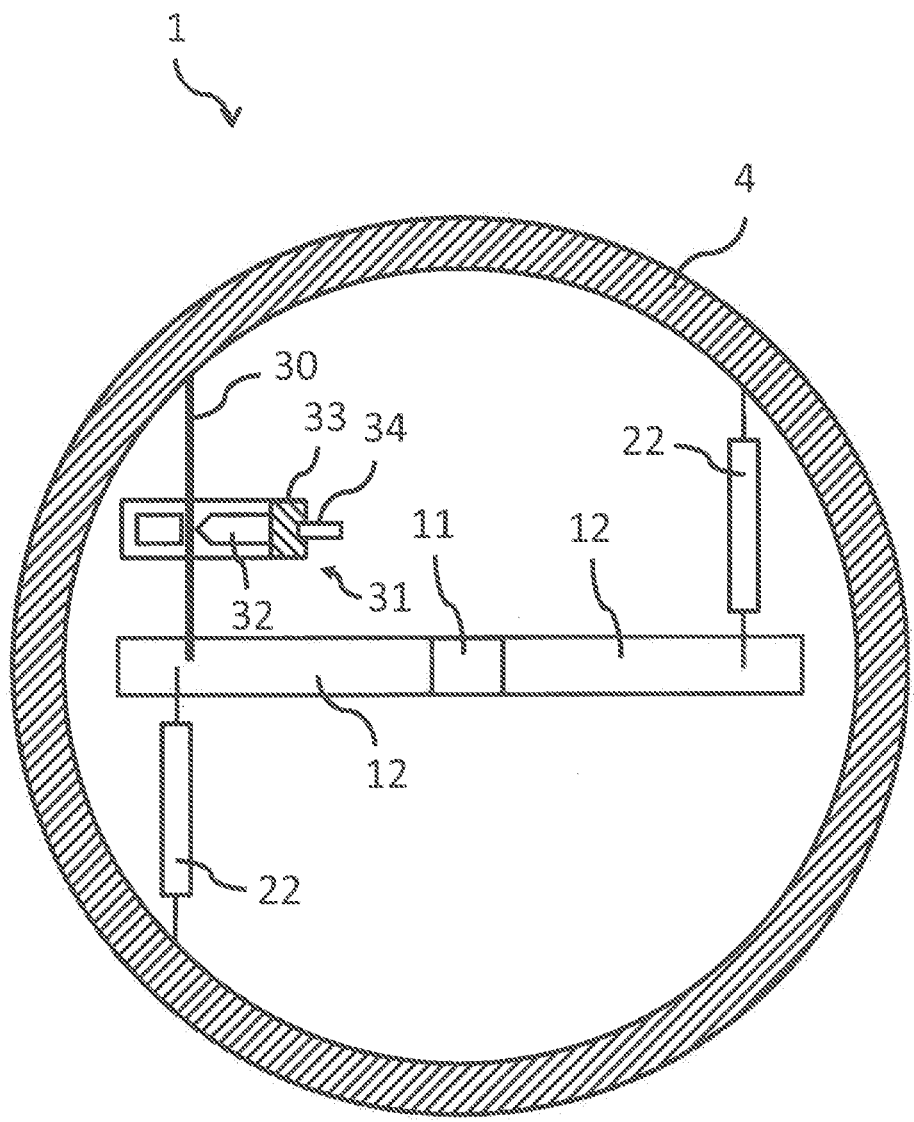
FIG. 6 is a sectional top view illustrating the vortex generator arrangement of FIG. 5.

FIG. 1 shows an exemplary embodiment of an aircraft 51 and a flow control system 41 according to the present disclosure. The aircraft 51 comprises two engines 53 (only one can be seen in FIG. 1) and the flow control system 41, which, in turn, comprises the vertical tail plane 43 of the aircraft 51 and a control unit not shown in the figures. The vertical tail plane 43 comprises a vertical stabilizer 45 and a vertical rudder or rudder surface 47. The rudder 47 is deflectable about a rudder axis 49 relative to the vertical stabilizer 45. The flow control system 41 further comprises a plurality of vortex generator arrangements 1 on both sides of the vertical stabilizer 45 along the rudder axis 49. The vortex generator arrangements 1 may, for example, be vortex generator arrangements 1 as shown in FIG. 2 or 6.

Figure 2:
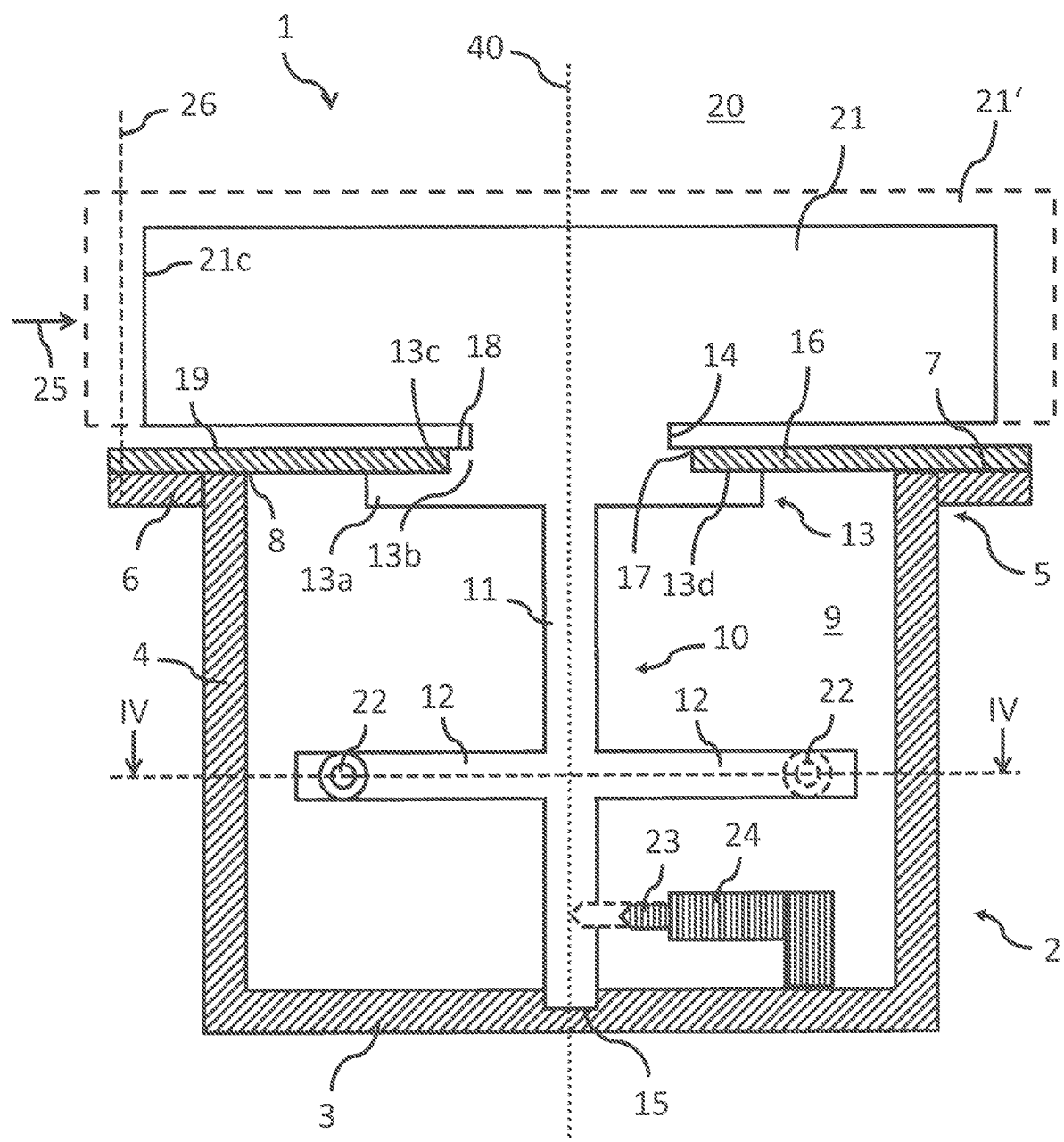
FIG. 2 is a sectional side view illustrating a first exemplary embodiment of a vortex generator arrangement according to the present disclosure.
Figure 3:
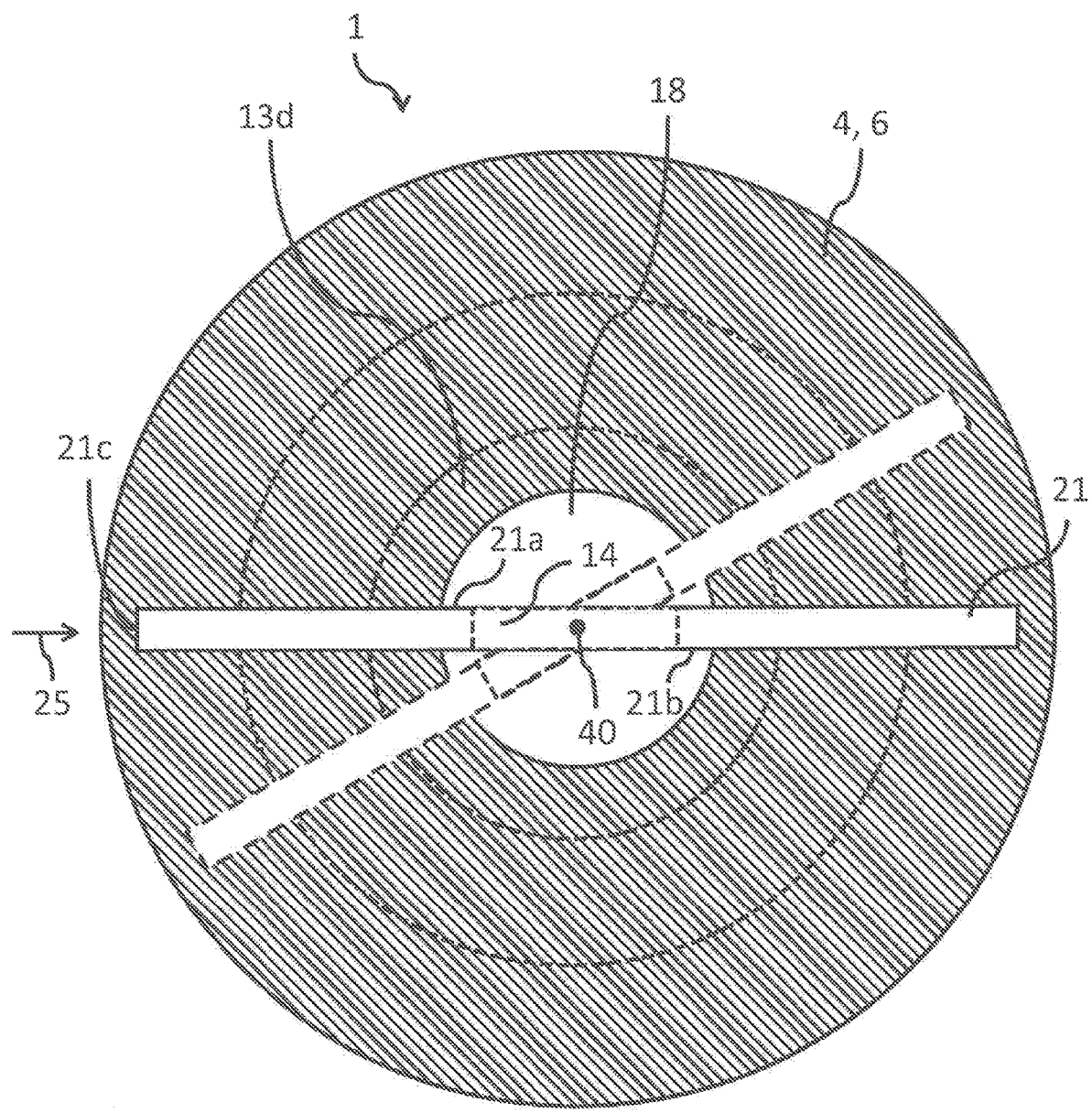
FIG. 3 is a top view illustrating the vortex generator arrangement of FIG. 2.
Figure 4:
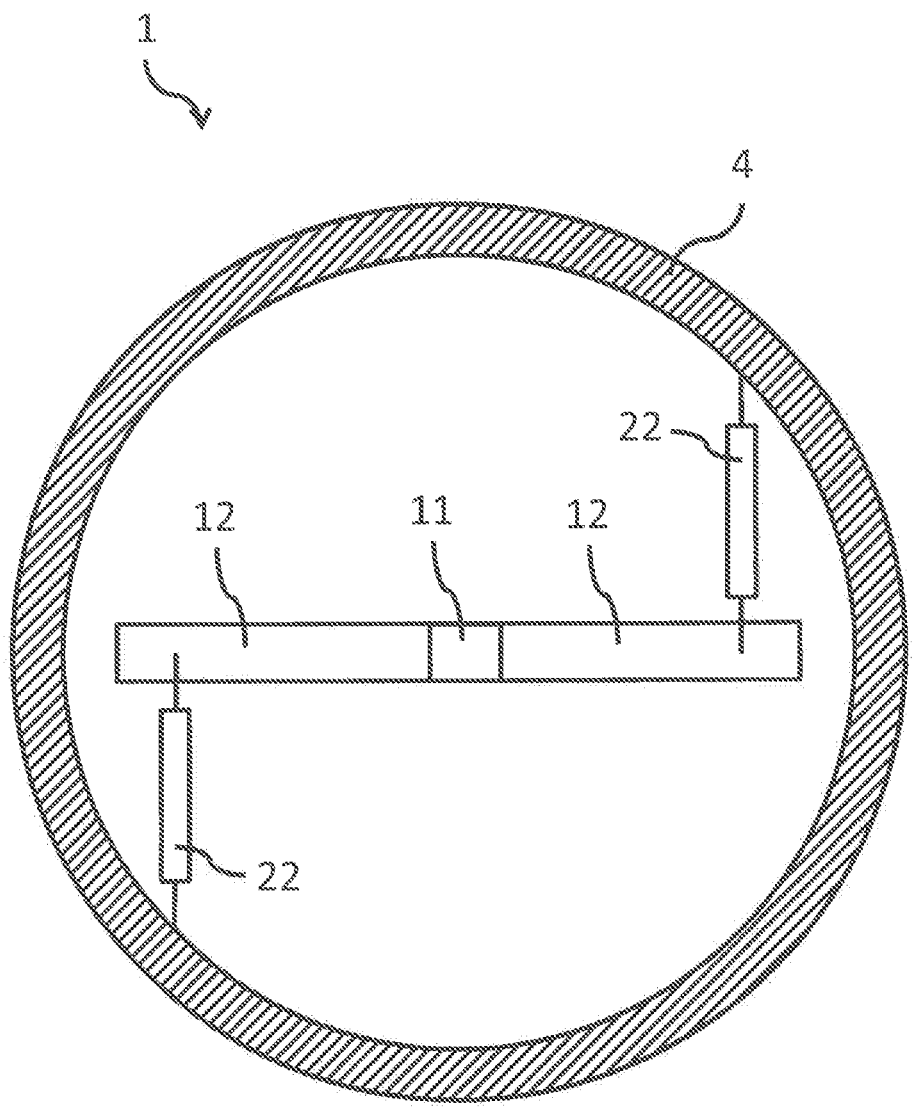
FIG. 4 is a sectional top view illustrating the vortex generator arrangement of FIG. 2.

In FIGS. 2 through 4 a first exemplary embodiment of the vortex generator arrangement 1 is shown. The vortex generator arrangement 1 comprises a cylindrical housing 2 having a planar bottom wall 3 and a sidewall 4 extending in an axial direction of the cylindrical housing 2 from the bottom wall 3. At the axial end 5 of the sidewall 4 opposite the bottom wall 3 the sidewall 4 is provided at the outside thereof with a circumferentially extending flange 6. The axial end surface of the sidewall 4 together with a top surface of the flange 6 provide a planar, annular first attachment surface 7, in which an opening 8 is provided.

The housing 2 defines an interior space 9, inside of which a support structure 10 is rotatably supported. The support structure 10 is integrally formed in one piece and comprises a central elongate shaft portion 11, two arm portions 12 radially extending in opposite directions from the shaft portion 11, a circular plate portion 13, and a support portion 14. The shaft portion 11 is supported at one of its ends in a recessed bearing 15 centrally provided in the bottom wall 3 and is rotatable about a rotational axis 40 which coincides with the axial direction or axis of symmetry of the cylindrical housing 2. The plate portion 13 comprises a first axial section 13a and a second axial section 13b having a diameter smaller than the first axial section 13a, so that a step 13c is formed between the two sections 13a, 13b. Thus, a planar annular second attachment surface 13d of the first axial section 13a is provided, which is arranged in a coplanar manner with the first attachment surface 7. A flexible sealing membrane 16 is adhesively secured to the first and second attachment surfaces 7, 13d such that it covers the entire opening 8 with the exception of a central aperture 17 provided centrally in the membrane 16. The second axial section 13b is disposed inside the aperture 17 and fills or essentially fills the aperture 17. It has the same thickness as the membrane 16, so that the upper surface 18 of the second axial section 13b and the upper surface 19 of the membrane 16 together form an essentially continuous surface portion 18, 19.

As will be described in more detail below, in operation of the aircraft 51 a flow is established in the region 20 of space above the surface portion 18, 19, and the surface portion 18, 19 constitutes a flow surface for that flow. Advantageously, the sealing membrane 16 completely seals the interior space 9 of the housing 2 from environmental influences, such that water and dirt are prevented from entering the interior space 9 and from impeding the operability of the vortex generator arrangement 1. The sealing membrane 16 is preferably provided in a single piece.

The support portion 14 extends from the upper surface 18 of the second axial section 13b into the region 20 of space, and a vortex generating element 21 is connected to and supported by the support portion 14. The vortex generating element 21 is integrally formed in one piece with the support portion 14 or a separate element secured to the support portion 14, and is a planar plate having two parallel opposite extended surfaces 21a, 21b and an edge surface 21c extending between the extended surfaces 21a, 21b (see also FIG. 3).

As shown in FIG. 3, the vortex generating element 21 is rotatable together with the support structure 10 about the rotational axis 40 between a first rotational position indicated in continuous lines in FIG. 3 and a second rotational position indicated in dashed lines in FIG. 3. These two rotational positions, which have an angular displacement of, e.g., 30° with respect to each other, may be defined by suitable stop arrangements. As can be best seen in FIG. 4 which represents a cross-sectional view taken along the line IV-IV in FIG. 2, the vortex generating element 21 is biased into the second rotational position by two tension springs 22, each of which is connected between the sidewall 4—or another part of the vortex generator arrangement stationary with respect to the sidewall 4—and another one of the arm portions 12.

However, during normal operation of the aircraft 51 and the flow control system 41 the vortex generating element 21 is in the first rotational position and retained therein by a retainer 23. In the exemplary embodiment shown in FIG. 2 the retainer 23 comprises or is formed by a pin 23 which is movable between a locking position indicated in FIG. 2 by dashed lines and a release position indicated in FIG. 2 by continuous lines. In the locking position the pin 23 engages a recess in the shaft portion 12. The pin 23 can be moved by a release 24, which comprises or is formed by an actuator 24 to the release position in which the pin 23 does not engage with the shaft portion 12 anymore. The vortex generating element 21 is, thus, released from the retainer 23 and moved by the biasing device 22 from the first rotational position to the second rotational position while deforming the membrane 16.

The vortex generating element 21, the support structure 10 and the retainer 23 are arranged in such a manner that in the first rotational position the two extended surfaces 21a, 21b of the element 21 are parallel to a predetermined direction 25, which is in turn parallel to the flow surface 18, 19 and fixedly defined with respect to the housing 4. The predetermined direction 25 corresponds to a direction of a flow flowing over the flow surface 18, 19 during operation of the aircraft 51. A portion of the edge surface 21c is facing opposite to the flow direction 25. Consequently, in the first rotational position the vortex generating element 21 produces minimum drag, although it is fully disposed inside the flow in the second region 20 of space. By contrast, in the second rotational position the area of the projection of the vortex generating element 21 onto a projection plane 26, which extends perpendicularly with respect to the flow direction 25 and the surface portion 18, 19 is significantly increased as compared to the case of the first rotational position, so that the vortex generating element 21 now generates significant drag and turbulence inside the flow.

As will be understood from the above explanations, the vortex generator arrangement 1 is a single use vortex generator arrangement 1. Once the release 24 has released the vortex generating element 21 from the retainer 23 the vortex generating element 21 moves from the first rotational position to the second rotational position and cannot be moved automatically back to the first rotational position. Due to the above-described orientation of the vortex generating element 21 in the first rotational position with respect to the flow, it advantageously essentially does not affect the flow about the aircraft 51 in regular operation. However, because the additional drag generated by the vortex generating element 21 in the second rotational position does not have a significant detrimental effect on the flight envelope, no structure has to be provided to move the vortex generating element 21 back into the first rotational position once the vortex generator arrangement 1 has been activated. The vortex generator arrangement 1 is, therefore, of a very simple construction.

This is also due to the fact that no external power source is required for actuating the vortex generator arrangement 1. The only external contact that is required is a signal to the release 24 such that the vortex generating element 21 is released from the retainer 23.

The vortex generating element 21 is always located completely inside the region 20 of space. Consequently, the dimensions of the vortex generating element 21 are advantageously not limited by the housing 4, and it is easily possible to replace the vortex generating element 21 with another vortex generating element 21' of, e.g., larger dimensions, as illustrated in FIG. 2.

Figure 5:
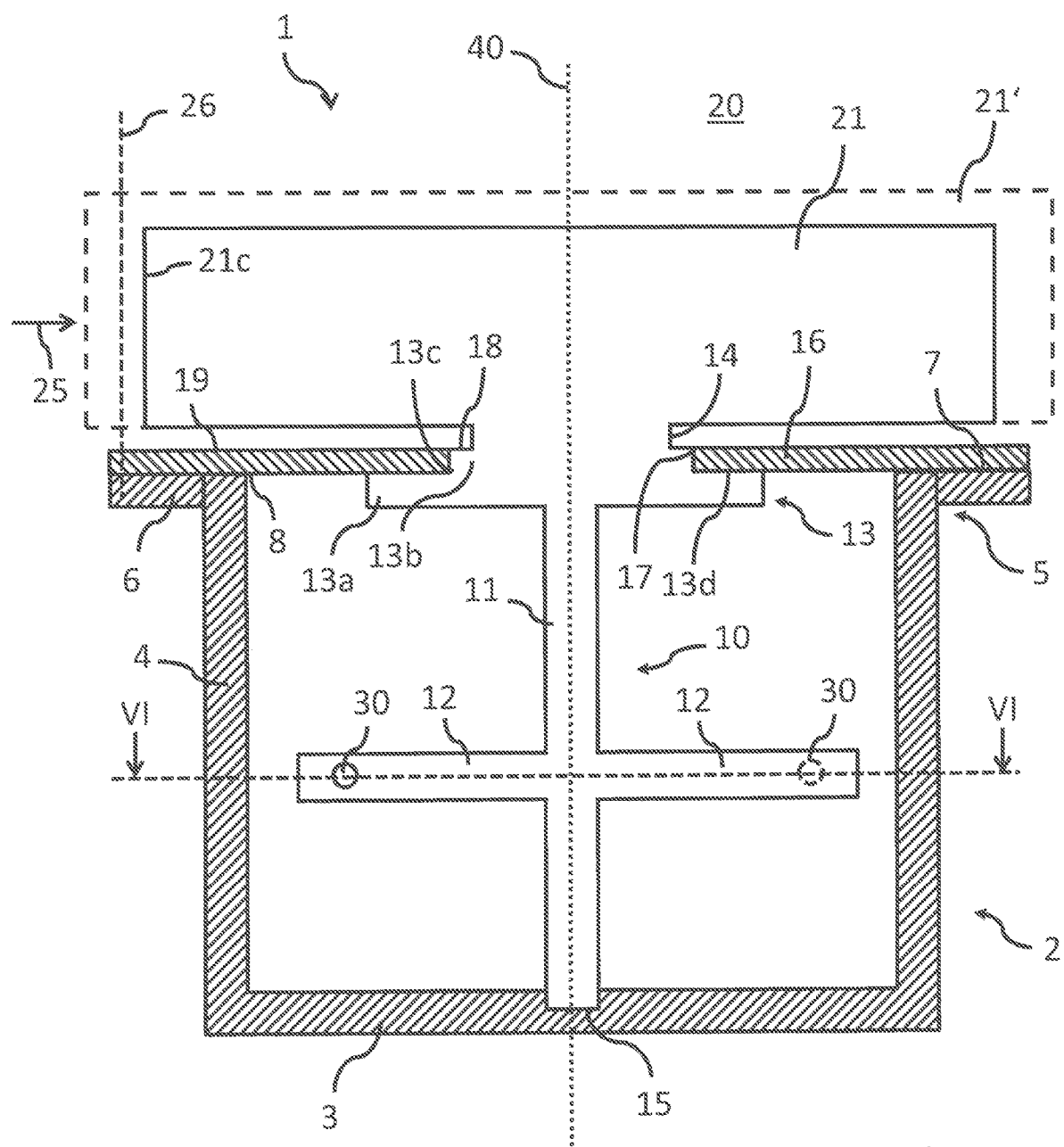
FIG. 5 is a sectional side view illustrating a second exemplary embodiment of a vortex generator arrangement according to the present disclosure.

A second exemplary embodiment of a vortex generator arrangement 1 is shown in FIGS. 5 and 6. It differs from the embodiment of FIGS. 2 to 4 only in the employed retainer and release. For the sake of brevity we will, therefore, refrain from repeating the above considerations and explanations that likewise apply to the exemplary embodiment shown in FIGS. 2 through 4 and only discuss the differences.

The vortex generator arrangement 1 shown in FIGS. 5 and 6 comprises a retainer 30 in form of a wire 30 which is fixedly coupled between the sidewall 4—or another part of the vortex generator arrangement stationary with respect to the sidewall 4—and one of the arm portions 12. The release 31 comprises or is provided in the form of a pyrotechnic cutter 31. The pyrotechnic cutter 31 comprises a piston 32, a propellant 33 and a detonator 34. For releasing the vortex generator 1, a signal is send to the detonator 34. The detonator 34 ignites the propellant 33 which accelerates the piston 32. The piston 32 than hits the respective wire 30 cutting it in two or more pieces thereby releasing the vortex generator 1 from the retainer 30. Such pyrotechnic cutters 31 have been found to be very reliable even under harsh operating conditions.

In both exemplary embodiments the control unit of the flow control system 41 is adapted or configured to monitor the deflection of the vertical rudder or rudder surface 47 about the rudder axis 49. If the deflection exceeds a predetermined value, the control unit activates the vortex generator arrangements 1 and, to be more precise, the release 24, 31 of the vortex generator arrangements 1 to release the vortex generating elements 21 from the retainer 23, 30. The vortex generating elements 21 are then moved from the first rotational, low-drag positions to their respective second rotational positions and influence the flow about the vertical tail unit 43. In particular, the vortex generating elements 21 improve the flow along the vertical rudder 47 such that the vertical rudder 47 can be deflected further about the rudder axis 49 without risking a stall of the flow. Thus, additional yawing moment can be provided.

Figure 7:
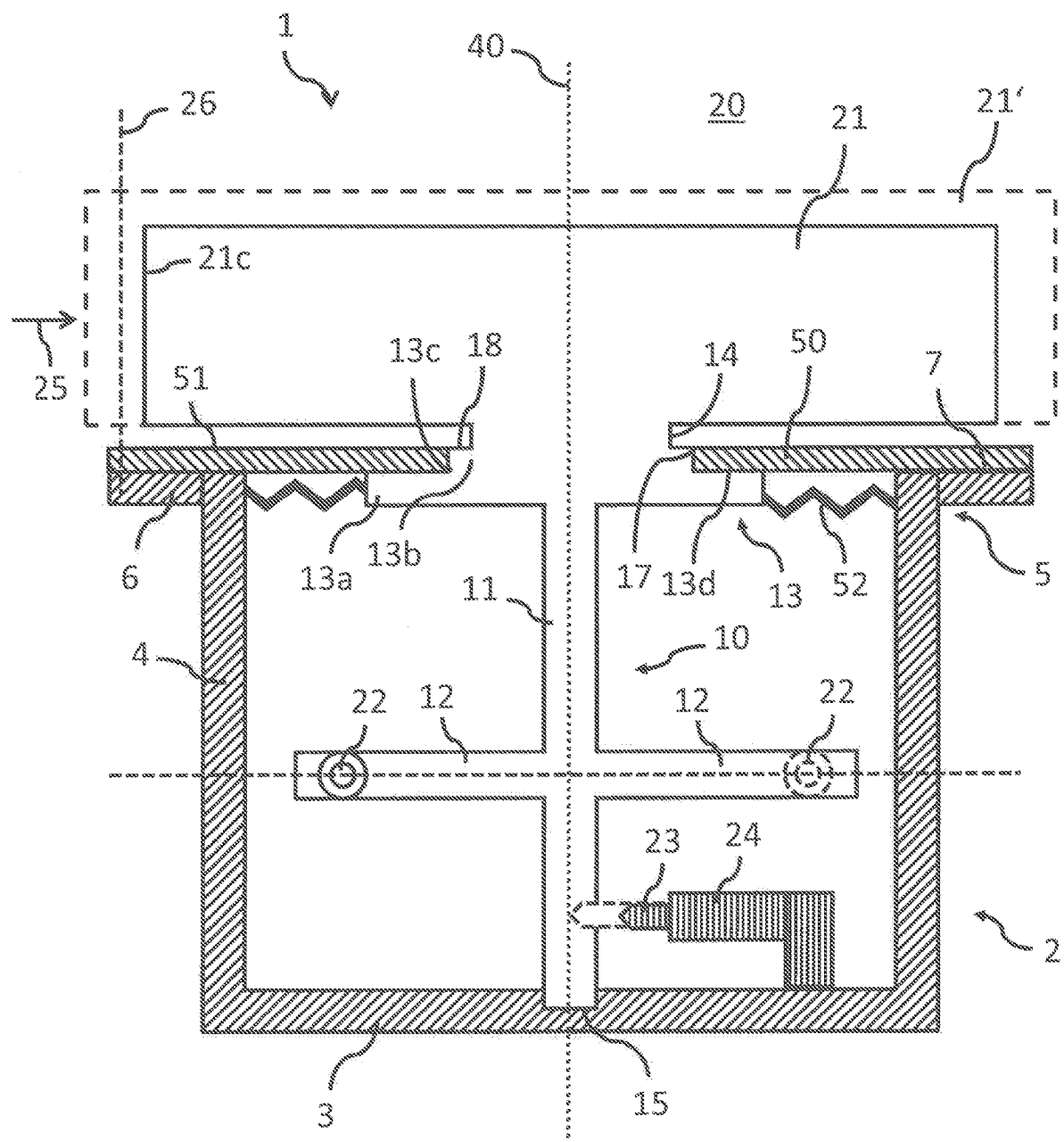
FIG. 7 is a sectional side view illustrating a third exemplary embodiment of a vortex generator arrangement according to the present disclosure.

A third exemplary embodiment of a vortex generator arrangement 1 is shown in FIG. 7. It differs from the embodiment of FIGS. 2 through 4 only in the construction of the surface portion and the seal. For the sake of brevity we will, therefore, refrain from repeating the above considerations and explanations that likewise apply to the exemplary embodiment shown in FIGS. 2 through 4 and only discuss the differences.

As compared to the vortex generator arrangement of FIGS. 2 through 4, in the vortex generator arrangement 1 of FIG. 7 the sealing membrane 16 has been replaced with a planar, annular plate 50, which is rigidly secured to the first attachment surface 7 such that it covers the entire opening 8 with the exception of a central aperture 17 provided centrally in the plate 50. The second axial section 13b of the circular plate portion 13 is disposed inside the aperture 17 and fills or essentially fills the aperture 17. It has the same thickness as the plate 50, so that the upper surface 18 of the second axial section 13b and the upper surface 51 of the plate 50 together form an essentially continuous surface portion 18, 51.

A corrugated or convoluted flexible sealing membrane 52 having an annular shape is secured at an outer circumferential edge to the sidewall 4 and at an inner circumferential edge to the second axial section 13b of the circular plate portion 13. Consequently, the membrane 52 is effective to seal the interior space 9 of the housing 2 against entry of snow, ice, rain and other contamination. Further, due to the fact that the membrane 52 does not need to provide a part of the surface portion or flow surface 18, 51, it can be provided in the corrugated or convoluted configuration in order to allow it to deform more easily upon rotation of the support structure 10. Therefore, the mechanical stress on the membrane 52 is significantly reduces as compared to the membrane 16 of FIGS. 2 to 4, so that the vortex generator arrangement 1 of FIG. 7, although of slightly more complex construction, may have a longer service life when reused after having been actuated, either by manually moving the support structure 10 back into the first rotational position or by using a suitable automatic structure or means, such as an electric motor, which may then be part of the vortex generator arrangement 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vortex generator arrangement for an aircraft, the vortex generator arrangement comprising:
   a surface portion facing and bounding a first region of space, wherein the surface portion is configured to constitute a flow surface for a flow present in operation in the first region of space;
   a vortex generating element disposed in the first region of space;

an element support structure rigidly connected to the vortex generating element;

a mounting structure to which the element support structure is mounted such that the element support structure and the vortex generating element together are rotatable, with respect to the mounting structure, about a rotational axis between a first rotational position and a second rotational position, wherein the rotational axis extends transversely with respect to the surface portion;

a biasing device configured to bias the vortex generating element towards the second rotational position;

a retainer configured to retain the vortex generating element in the first rotational position against a biasing provided by the biasing device; and a release configured to release the vortex generating element from the retainer, such that it is moved into the second rotational position by the biasing device;

wherein the vortex generating element is disposed completely in the first region of space in each rotational position thereof about the rotational axis;

wherein a projection of the vortex generating element onto a projection plane is smaller in the first rotational position than in the second rotational position; and wherein the projection plane extends perpendicularly to a tangent plane of the surface portion at a reference point of the surface portion and to a predetermined direction parallel to an extension of the tangent plane.

2. The vortex generator arrangement according to claim 1, wherein the rotational axis extends perpendicularly with respect to the surface portion.

3. The vortex generator arrangement according to claim 1, wherein the vortex generating element is a planar plate having a first extended surface, an opposite second extended surface, and a circumferential edge surface extending between the first and second extended surfaces.

4. The vortex generator arrangement according to claim 1, wherein the vortex generating element extends from the surface portion or is spaced from the surface portion by an intermediate portion of the element support structure located inside the first region of space.

5. The vortex generator arrangement according to claim 1, wherein at least a part of the surface portion is a surface of a flexible seal connected to both the mounting structure and the element support structure.

6. The vortex generator arrangement according to claim 1, wherein the element support structure comprises a plate-shaped portion having a surface section constituting at least a part of the surface portion.

7. The vortex generator arrangement according to claim 1, wherein:

the mounting structure comprises a housing defining an interior space, which constitutes a second region of space, the biasing device, the retainer, the release, and at least a part of the element support structure are located inside the interior space of the housing, and the surface portion is provided by an outer surface of the housing.

8. The vortex generator arrangement according to claim 1, wherein the element support structure comprises an elongate shaft portion, which extends along and defines the rotational axis, and at least one projection, which extends radially from the shaft portion, and wherein the biasing device is configured to engage the at least one projection.

9. The vortex generator arrangement according to claim 1, wherein the biasing device comprises a spring element.

10. The vortex generator arrangement according to claim 1, wherein the retainer comprises a lock that is movable between a locking position and a release position and is configured to engage a corresponding locking feature on the element support structure when the element support structure is in the first rotational position and the lock is in the locking position, such that movement of the element support structure from the first rotational position towards the second rotational position is prevented, and the release comprises an actuator configured to move the lock between the locking position and the release position.

11. The vortex generator arrangement according to claim 1, wherein the retainer comprises a strap or a wire connecting the element support structure to the mounting structure to retain the element support structure in the first rotational position, and the release comprises a pyrotechnic cutter for cutting the strap or the wire to release the vortex generator from the retainer.

12. A flow control system comprising:

an aerodynamic body for an aircraft;

a plurality of vortex generator arrangements according to claim 1 arranged on the aerodynamic body such that the surface portion of each of the vortex generator arrangements forms a respective part of a surface of the aerodynamic body; and a control unit configured to selectively actuate the release of one or more of the plurality of vortex generator arrangements.

13. The flow control system according to claim 12, wherein:

the aerodynamic body comprises a base portion and a control portion movably coupled to the base portion such that the control portion is deflectable with respect to the base portion about a pivot axis from a first angular position towards a second angular position in one or both rotational directions;

the plurality of vortex generator arrangements are arranged along the pivot axis on the base portion or the control portion; and the control unit is configured to actuate the release to release the element support structure from the retainer when a deflection of the control portion from the first angular position towards the second angular position exceeds a predetermined value.

14. An aircraft comprising a flow control system according to claim 12, wherein each of the vortex generator arrangements is arranged such that, in flight of the aircraft, a flow over the surface portion of a respective one of the plurality of vortex generator arrangements is established.

15. The aircraft according to claim 14, wherein the surface portion is a part of a surface of a wing, a vertical or horizontal tail plane, a flap, a slat, a rudder, or a high lift device of the aircraft.

16. An aircraft comprising one or more vortex generator arrangement according to claim 1, each of the one or more vortex generator arrangements being arranged such that, in flight of the aircraft, a flow over the surface portion of a respective one of the one or more vortex generator arrangement is established.

17. The aircraft according to claim 16, wherein the surface portion is a part of a surface of a wing, a vertical or horizontal tail plane, a flap, a slat, a rudder, or a high lift device of the aircraft.

18. The aircraft according to claim 16, wherein the rotational axis extends perpendicularly with respect to the surface portion.

19. The aircraft according to claim 16, wherein the vortex generating element is a planar plate having a first extended surface, an opposite second extended surface, and a circumferential edge surface extending between the first and second extended surfaces.

20. The aircraft according to claim 16, wherein the vortex generating element extends from the surface portion or is spaced from the surface portion by an intermediate portion of the element support structure located inside the first region of space.

* * * * *